United States Patent [19]

Atamian

[11] Patent Number: 4,970,793
[45] Date of Patent: Nov. 20, 1990

[54] METHOD AND APPARATUS FOR DETERMINING THE POSITION OF STARS

[76] Inventor: George C. Atamian, 2315 N. Laurel Ave., Upland, Calif. 91786

[21] Appl. No.: 478,472

[22] Filed: Feb. 12, 1990

[51] Int. Cl.⁵ ............................................. G01C 17/34
[52] U.S. Cl. ...................................... 33/268; 434/289
[58] Field of Search ........................ 33/268, 269, 270; 434/284, 287, 289

[56] References Cited

U.S. PATENT DOCUMENTS

| | | | |
|---|---|---|---|
| 2,372,487 | 3/1945 | Hagner | 434/289 X |
| 3,169,319 | 2/1965 | Hoffmeister | 33/269 |
| 4,702,703 | 10/1987 | Herbst | 434/289 |

OTHER PUBLICATIONS

Popular Science, Jan. 1944, p. 91, ("By Deering" etc.).

Primary Examiner—Harry N. Haroian
Attorney, Agent, or Firm—Price, Gess & Ubell

[57] ABSTRACT

An astronomical correlator for determining the position of the stars and method of using the same includes a transparent hollow globe having phosphorescent indicia. A horizon ring member and a latitude scale member can be utilized for defining the field of view of the night sky in correlation with the date and time. A flash light assembly can activate phosphorescent material, both on the transparent globe and on an alignment assembly, that permits a sighting by the observer of the night sky through the globe for determining the identification of stars.

15 Claims, 2 Drawing Sheets

METHOD AND APPARATUS FOR DETERMINING THE POSITION OF STARS

BACKGROUND OF THE INVENTION

1. Field of the Invention

The present invention relates to an astronomical correlator and method of determining the position of stars and celestial objects and, more particularly, relates to a relatively simple and convenient method of identifying celestial objects in the night sky.

2. Description of Related Art

Attempts have been made to define and identify celestial objects such as planets and stars. Star charts are common and numerous models of the solar system and planets have been provided. Additionally, planetariums, both of a sophisticated and of a relatively simple configuration, are well known in the prior art.

U.S. Pat. No. 3,520,073 discloses a multi-purpose display planetarium that can act either as a model of our solar system or project representations of stars onto screens.

U.S. Pat. No. 4,400,162 discloses a planetarium defining the relative position of the sun and planets within an apertured sphere showing a background of stars. These astronomical bodies can be represented by both fluorescent and phosphorescent indicia that can be excited by ultraviolet light and visible light, thereby providing options in the form of displays that can be achieved.

There is still a demand for a relatively inexpensive astronomical correlator that can be readily utilized by children to easily locate and identify celestial bodies such as stars and planets.

SUMMARY OF THE INVENTION

The present invention provides an astronomical correlator and method for determining the positions of stars and celestial objects.

This is accomplished by providing a transparent, hollow globe that can be mounted on a base member containing a source of light such as a flash light assembly. A rotatable cantilevered support member can extend radially inward from an inner surface of the globe to support a pivotable alignment member that is adjustably positioned at the centroid of the globe and coated with phosphorescent material. Preferably, the pivotable alignment member has a humanoid configuration to serve as a point of reference in the sighting of stars. The hollow globe member can be imprinted with indicia, including phosphorescent indicia representing the relative positions of stars in the night sky. A ring member can be removably positioned about the globe to provide a point of reference for the observer's horizon. The ring member can be correlated with the time and date at a particular latitude on the globe, for defining the observable night sky.

A removable scale can conform to the exterior surface of the globe to assist in indicating a latitude position for the earth-bound observer or to locate the zenithal point. The ring member can also bear indicia indicating the direction of north to further assist in defining a relative alignment of the globe with the night sky.

In operation, the globe can be positioned on its mounting base so that the North Pole (in the northern hemisphere) is straight up and the equator is horizontal. From the ecliptic scale on the globe, the position of the sun can be defined relative to the date of the observation. As a further assistance, a small sticker indicating the sun can be positioned on the globe.

An additional reference table can provide the geographical latitude, and a degree scale comprising a flat, flexible scale with degrees from 0° to 90° can be applied to the globe. The 0° position can be placed on the equator, with the 90° position on the North Pole. The globe can then be rotated on its base until the latitude number is pointing straight up. The ring member can then be placed about the globe so that it is horizontal, and an indicator of north on the ring member should be positioned to be aligned with and below the actual North Pole position indicated on the globe. The globe can then be rotated towards the West until the position of the sun is just below the horizon ring indicating the setting of the sun at that point. At this position, the portion of the globe above the horizon ring discloses the stars that will be visible in the sky at that particular date to a person at that latitude. This system can be used to create an accurate astrometric situation for any date, past or future, for any observer on earth. To facilitate the use of the globe at night, the flash light assembly in the base member is activated to excite the phosphorescence of the stars, both on the globe and on an alignment indicator that is positioned approximately in the center of the globe. The observer can then look through the globe with the horizon ring defining the field of view to identify the juxtaposition of the stars in the sky.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENTS

The following description is provided to enable any person skilled in the toy industry to make and use the invention and sets forth the best modes contemplated by the inventor of carrying out his invention. Various modifications, however, will remain readily apparent to those skilled in the toy field, since the generic principles of the present invention have been defined herein specifically to provide a relatively easily manufactured astronomical correlator for use by children.

Figure 1:
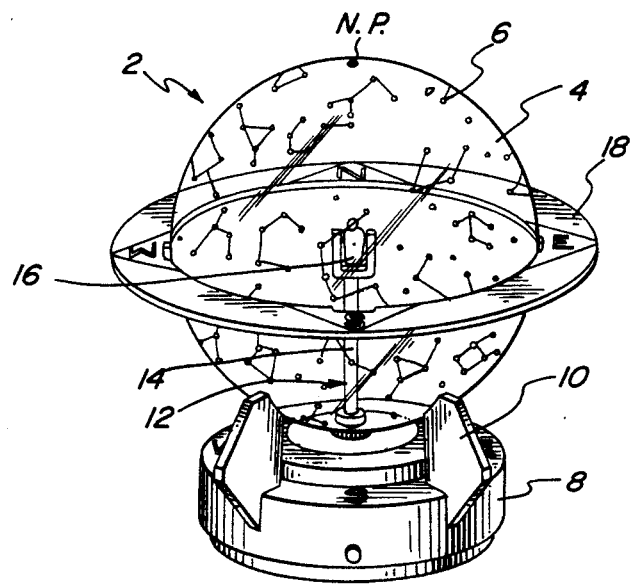
FIG. 1 is a perspective view of the correlator assembly.

Referring to FIG. 1, the astronomical correlator assembly 2 is disclosed in a perspective view and includes a transparent, hollow, spherical globe 4 having a celestial cartography and an ecliptic scale 24 of the sun position by dates printed thereon. While not shown, the names of the stars and constellations can also be printed on the inside surface of the globe 4 so that it is visible when an observer looks through the globe. An indicator of the 24-hour day is also imprinted on the equator 28. The globe 4 can be formed from a transparent acrylic resin and, preferably, is approximately five or six inches in diameter. The celestial indicia, such as the stars 6, can be printed in phosphorescent material and can include an indicator of the celestial North Pole, NP.

The globe 4 can be stored on a base member 8 having a plurality of supporting columns 10 that have surfaces complementary to the curvature of the globe 4 to permit an easy rotation of the same. The cardinal points of North, South, East, and West can be indicated on the base member 8. An alignment assembly 12 is rotatably mounted on the interior of the globe surface and extends in a cantilevered fashion towards the North Pole and terminating at the centroid of the globe 4. The alignment assembly 12 represents the earth's axis of rotation. Pivotally mounted at the end of the support member 14 is an alignment member 16 configured to simulate a miniature human form. The alignment member 16 is attached to the support member 14 through a U-shaped end of the support member 14, with the pivot point extending through the shoulders of the alignment member 16. The head of the alignment member 16 can be coated with phosphorescent material, and is positioned at the approximate centroid of the sphere of the globe 4.

Figure 3:
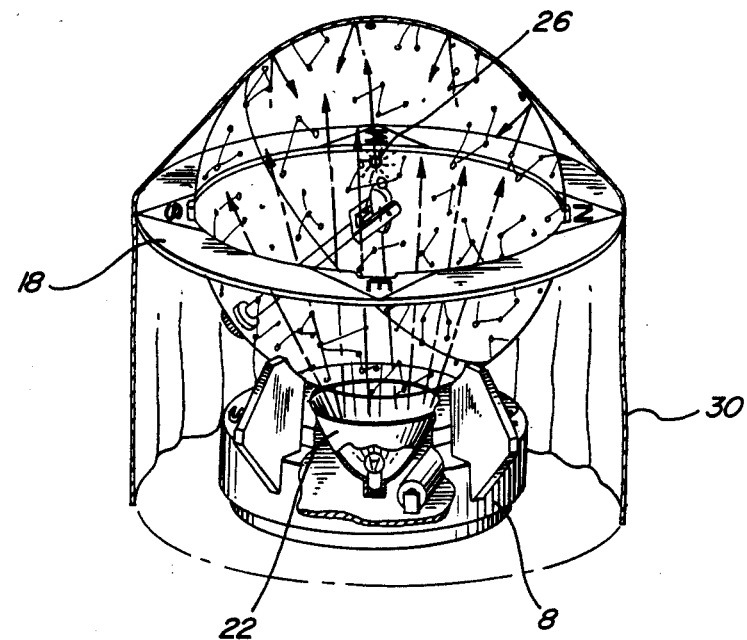
FIG. 3 is a perspective view of the correlator assembly rotated to define the stars that would be available for observation in the sky at the particular date and year from a given latitude.

By referring to FIG. 3, it can be seen that a knob on the exterior of the globe 4 can be utilized to rotate the support member 14. As shown in FIGS. 1 and 3, the cantilevered support member 14 is mounted on the axis of the North and South Poles of the globe 4.

A horizon ring member 18 is removably positioned about the globe 4 and can carry indicia indicative of the cardinal north, south, west, and east directions.

Figure 2:
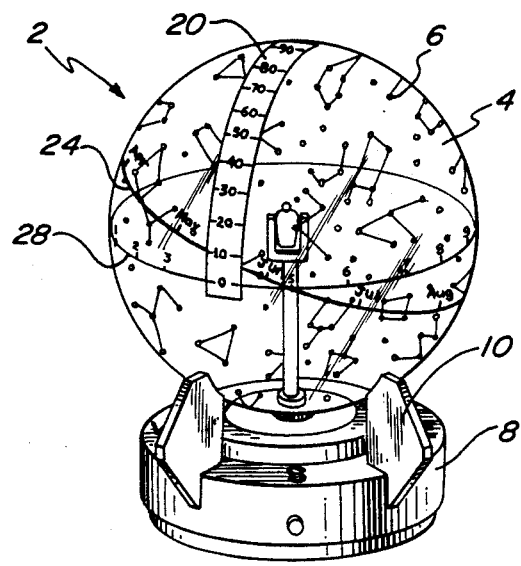
FIG. 2 is a perspective view with the latitude scale.

Referring to FIG. 2, a flexible plastic latitude scale member that can conform to the exterior surface of the globe 4 can be utilized to indicate the specific latitude of the observer relative to the North Pole.

In operation, the globe member 4 can be positioned as shown in FIG. 1, with the North Pole at the top and the equator forming the horizontal position. It is then necessary to determine the specific night sky that will be available for viewing for the particular latitude of the observer and for the particular time of year. In this regard, a sun position table or reference line 24 is provided with dates on the globe 4 and can be utilized to determine the particular position of the sun when it sets for the particular date.

A removable sun sticker 26 can be attached to the exterior of the globe 4 indicating the setting location of the sun for that particular calendar date. As shown in FIG. 2, the latitude scale 20 can be utilized with the 0° mark placed on the equator and the 90° mark placed on the North Pole, NP. Again, a reference chart or even a convenient atlas can be used to determine the specific geographic latitude of the observer. With this particular number, the globe 4 can then be rotated in the direction of the North Pole until the latitude number is pointing straight up. This latitude position can define a vertical plane to the center of the globe 4. The horizon ring member 18 can then be placed about the globe 4 so that the ring member 18 is arranged horizontally, and the north indicator (N) on the ring should be above the N indicator on the power base and below the pole (NP) on the globe 4, as shown in FIG. 3. The globe can then be rotated relative to the horizon ring 18, for example, by slightly lifting up the horizon ring 18 and gripping the globe 4 so that it can be turned to the west until the sun position on the globe is just below the horizon as defined by the ring 18. Care should be taken to keep the angle of the pole with respect to the horizon and, if necessary, it should be readjusted using the latitude scale 20. In this arrangement, the stars printed as indicia 6 on the globe will be appropriately aligned with the actual stars in the night sky. It is also possible to use planet stickers and position them on the globe 4 by an appropriate alignment as to where their position should be for that particular date. This is simply an optional feature that can be utilized to further enhance the value of the astronomical correlator.

As can be readily appreciated, the earth is rotating and the night sky is changing. The rate of rotation is about 15 degrees per hour. By simply rotating the globe 4 westward, keeping the polar angle the same, the actual star configurations can be correlated for any particular time of the night.

An hour scale is printed on the celestial equator to facilitate locating planets and to keep track of the passage of time.

In actual practice, the observer should utilize the astronomical correlator when the sky is sufficiently clear and dark to see the stars. The observer can take the astronomical correlator outside and align the sun symbol pointing in the direction where the actual sun sets on the horizon. Usually about one hour after sunset, stars start to become visible.

Figure 4:
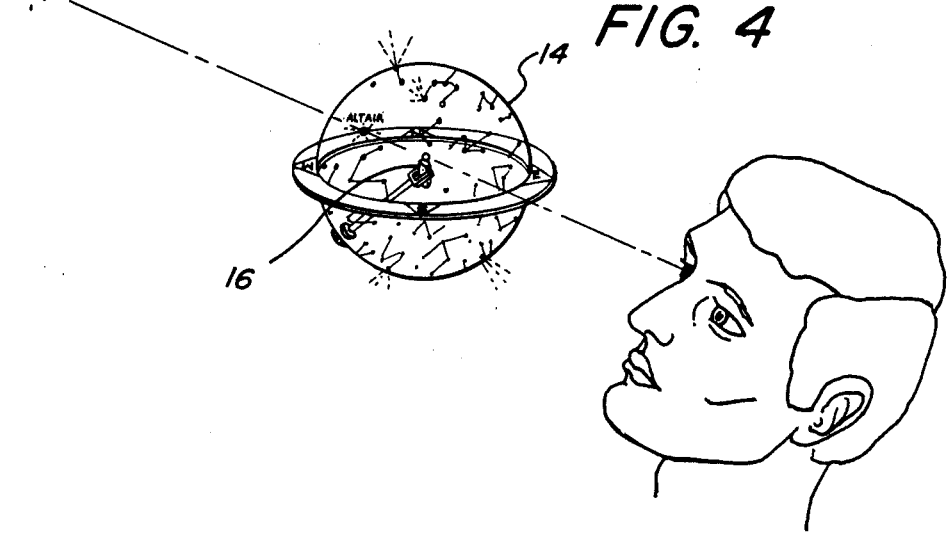
FIG. 4 is a perspective view disclosing the sighting and alignment of stars and planets through the globe.

Referring to FIG. 3, a flash light assembly 22 is mounted on the base member 8. This flash light is of a wavelength complementary with the phosphorescent indicia on both the alignment member and the interior surface of the globe. The flash light assembly 22, when activated, produces a sufficient amount of light to cause the phosphorescence to glow for a couple of minutes, thereby facilitating the observer's viewing and alignment of stars through the globe 4, as shown in FIG. 4. The user is also provided with a flexible reflective material which is placed over the globe to increase the efficiency of the activation process. The flexible material 30 can be a lightweight ½-mil mylar drop cloth, double coated with an aluminum coating, and of a size to cover the globe 4 and base member 8 to maximize the application of the flash light to the phosphorescent indicia and also to block the light from the observer's eyes. The observer sights through the transparent globe 4 above the horizon as defined by the ring member 18 to identify, by juxtaposition of the glowing indicia 6 on the inner surface of the globe 4, with the actual stars in the sky.

As can be readily appreciated, the astronomical correlator of the present invention is educational and provides significant entertainment value to a juvenile at a relatively low cost. When the globe 4 is rotated for alignment purposes, it can be appreciated that the alignment assembly support member 14 can also be rotated by the exterior knob to enable the human form alignment member 16 to freely rotate in response to gravity, thereby assuring a target position to correlate the observer's viewing of the night sky through the globe.

Those skilled in the art will appreciate that the above-described preferred embodiment is subject to numerous modifications and adaptations without departing from the scope and spirit of the invention. Therefore, it is to be understood that, within the scope of the appended claims, the invention may be practiced other than as specifically described herein.

What is claimed is:

1. An astronomical correlator for determining the position of stars, comprising:

a transparent hollow globe having phosphorescent indicia positioned about the globe indicating the relative positions of stars to an observer, and means for aligning the globe with stars in the night sky, including an alignment assembly positioned within and spaced from the hollow globe at a position predetermined to enable an observer to look through the transparent globe and sight with the alignment assembly to juxtaposition the indicia relative to the actual stars in the night sky, whereby the stars can be readily identified, the alignment assembly including a rotatable cantilevered support member extending radially inward from an inner surface of the globe and a pivotable alignment member coated with phosphorescent and mounted on the support member.

2. The correlator of claim 1 further including a flash light assembly to active the phosphorescent material at night.

3. The correlator of claim 1 further including a removable ring member positioned about the globe, the ring member bearing indicia indicating the direction of north whereby a horizon position relative to the indicia of stars can be established.

4. The correlator of claim 3 further including a removable scale that can conform to the exterior surface of the globe to indicate latitude position.

5. The correlator of claim 4 further including a base member for supporting the globe, the base member mounting the flash light assembly.

6. The correlator of claim 4 wherein the alignment member is configured to simulate a human form.

7. An astronomical correlator for determining the position of stars, comprising:

a transparent hollow globe having phosphorescent indicia positioned about the globe indicating the relative positions of stars to an observer, an alignment assembly positioned within and spaced from the hollow globe at a position predetermined to enable an observer to look through the transparent globe and sight with the alignment assembly to juxtaposition the indicia relative to the actual stars in the night sky whereby the stars can be readily identified, the alignment assembly including a pivotable alignment member positioned at the centroid of the globe and coated at that position with phosphorescent material, and means for exciting the phosphorescent to provide a visible glowing to enable an easy juxtaposition of the indicia with the actual stars.

8. The correlator of claim 7 wherein the alignment assembly includes a rotatable cantilevered support member extending radially inward from an inner surface of the globe.

9. The correlator of claim 7 wherein the means for exciting further includes a flash light assembly to activate the phosphorescent material at night.

10. The correlator of claim 7 further including a removable ring member positioned about the globe, the ring member bearing indicia indicating the direction of north whereby a horizon position relative to the indicia of stars can be established.

11. The correlator of claim 7 wherein the alignment member is configured to simulate a human form.

12. The correlator of claim 7 further including a removable scale that can conform to the exterior surface of the globe to indicate latitude position.

13. The correlator of claim 9 further including a base member for supporting the globe, the base member mounting the flash light assembly.

14. The correlator of claim 9 further including a reflective drop cloth to cover the globe during activation of the means for exciting.

15. A method of identifying stars by an observer with a transparent hollow globe having phosphorescent indicia positioned about the glove indicating the relative position of stars in the sky to the North Pole, an alignment assembly positioned within the hollow globe with phosphorescent, a ring member positioned about the glove with indicia indicating a north direction, means for exciting the phosphorescent to provide a visible glow, and a drop cloth, comprising:

positioning the globe to establish a corresponding global latitude position of the observer as defining a vertical plane through a center of the globe;

positioning the ring member about the globe to define a horizon corresponding to the actual horizon at that time of day;

establishing the position of north and aligning the globe in that direction, covering the globe and the means for exciting with the drop cloth;

exciting the phosphorescent indicia and the phosphorescence on the alignment assembly to a glowing state, and sighting through the globe above the horizon with the alignment assembly to identify by juxtaposition of the indicia on the globe with the actual stars in the sky, whereby star identification can be determined.

* * * * *